US008961358B2

(12) United States Patent
Hirabayashi

(10) Patent No.: US 8,961,358 B2
(45) Date of Patent: Feb. 24, 2015

(54) ELECTRIC POWER TOOL

(75) Inventor: Tokuo Hirabayashi, Anjo (JP)

(73) Assignee: Makita Corporation, Anjo (JP)

( * ) Notice: Subject to any disclaimer, the term of this patent is extended or adjusted under 35 U.S.C. 154(b) by 242 days.

(21) Appl. No.: 13/471,981

(22) Filed: May 15, 2012

(65) Prior Publication Data

US 2012/0322605 A1 Dec. 20, 2012

(30) Foreign Application Priority Data

Jun. 17, 2011 (JP) ................................. 2011-135440

(51) Int. Cl.
*F16H 3/44* (2006.01)
*B25B 21/02* (2006.01)
*B25B 21/00* (2006.01)

(52) U.S. Cl.
CPC ............... *B25B 21/02* (2013.01); *B25B 21/008* (2013.01)
USPC .......................................... 475/298; 475/300

(58) Field of Classification Search
CPC ....................................................... B25F 5/001
USPC .................................................. 475/298–300
See application file for complete search history.

(56) References Cited

U.S. PATENT DOCUMENTS 3,774,476 A * 11/1973 Sohnlein et al. .............. 475/299
4,364,286 A * 12/1982 Ciolli ............................ 475/270
5,019,023 A * 5/1991 Kurosawa ..................... 475/269
8,142,326 B2 * 3/2012 Chen ............................. 475/299
8,434,564 B2 * 5/2013 Tomayko et al. ............... 173/47
2005/0215385 A1 * 9/2005 Spielmann et al. ........... 475/298

FOREIGN PATENT DOCUMENTS

EP 2161477 A1 * 3/2010
JP B2-4468786 5/2010

* cited by examiner

*Primary Examiner* — Tisha Lewis
(74) *Attorney, Agent, or Firm* — Oliff PLC

(57) ABSTRACT

An electric power tool includes a housing, a motor disposed in the housing, a planetary gear reduction mechanism and an internal gear. The planetary gear reduction mechanism includes multi-stage planetary gears, multi-stage carriers each configured to carry a plurality of planetary gears, and a bearing assembled with a final-stage carrier from a rear side of the final-stage carrier to rotatably support the final-stage carrier. The internal gear is configured to be rotatable and axially slidable while allowing planetary motion of final-stage planetary gears supported by the final-stage carrier. A gear portion provided on the final-stage carrier is formed as a separate gear which is assembled with the final-stage carrier from the rear side of the final-stage carrier after assembling the bearing with the final-stage carrier.

16 Claims, 5 Drawing Sheets

ELECTRIC POWER TOOL

BACKGROUND OF THE INVENTION

This application claims the benefit of Japanese Patent Application Number 2011-135440 filed on Jun. 17, 2011, the entirety of which is incorporated by reference.

1. FIELD OF THE INVENTION

The present invention relates to an electric power tool, such as an impact driver, which includes a speed change mechanism capable of changing the rotation speed output to a final output shaft.

2. DESCRIPTION OF RELATED ART

In an electric power tool such as an impact driver, it is known that rotation of the output shaft of the motor is reduced by a planetary gear reduction mechanism positioned at a front side of the motor and then transmitted to a final output shaft such as a spindle and an anvil. For example, as disclosed in Japanese Patent No. 4,468,786, the planetary gear reduction mechanism includes multi-stage carriers arranged in the axial direction and each configured to carry planetary gears, and the final-stage carrier (i.e., a large-diameter carrier portion integral with the spindle) is rotatably supported by a bearing, such as a ball bearing, which is assembled from the rear side of the final-stage carrier.

The planetary gear reduction mechanism is provided with a speed change mechanism. The speed change mechanism includes an internal gear configured to be rotatable and axially slidable while planetary motion of the planetary gears is allowed, and the internal gear is slidably operated from outside the housing and movable between a first slide position and a second slide position. The first slide position is a position in which the internal gear is meshed both with the planetary gears and with a gear portion provided on the outer periphery of the carrier. The second slide position is a position in which the internal gear is only meshed with the planetary gears so that rotation of the internal gear is limited in the housing. In the first slide position, the speed reduction by the planetary gears is cancelled to achieve a high-speed mode, whereas in the second slide position, the speed reduction by the planetary gears is obtained to achieve a low-speed mode.

However, in the case where the speed change mechanism is positioned between the final-stage planetary gears and the carrier for the final-stage planetary gears, it is necessary that the inner diameter of the bearing should be greater than the outer diameter of a gear portion which is integrally connected to the carrier and the outer diameter of the carrier onto which the bearing is fitted should be greater than the outer diameter of the gear portion such that the bearing can be inserted over the gear portion from the rear side of the carrier. This disadvantageously causes the carrier and the bearing to increase in diameter, with the result that the outer diameter of the housing becomes larger, which leads to increased size of the electric power tool.

In view of the above, it would be desirable to provide an electric power tool in which diameter of the carrier and the bearing constituting the speed change mechanism can be reduced, which results a downsized housing.

SUMMARY OF THE INVENTION

In accordance with the present invention as embodied and described herein as a first aspect, an electric power tool comprises a housing, a motor disposed in the housing, a planetary gear reduction mechanism, and an internal gear. The planetary gear reduction mechanism is positioned at a front side of the motor and includes multi-stage planetary gears, multi-stage carriers arranged in a axial direction of the motor and each configured to carry a plurality of planetary gears, and a bearing assembled with a final-stage carrier from a rear side of the final-stage carrier to rotatably support the final-stage carrier. The internal gear is configured to be rotatable and axially slidable while planetary motion of final-stage planetary gears supported by the final-stage carrier is allowed. In this electric power tool, the internal gear is selectively slidable between an advanced position in which the internal gear is positioned rearward of the bearing and meshed both with a gear portion provided on the final-stage carrier and with the final-stage planetary gears and a retracted positioned in which the internal gear is only meshed with the final-stage planetary gears so that rotation of the internal gear is limited in the housing, whereby rotation speed output from the final-stage carrier is variable. Further, the gear portion is formed as a separate gear which is assembled with the final-stage carrier from the rear side of the final-stage carrier after assembling the bearing with the final-stage carrier.

Preferably, in a second aspect, the electric power tool according to the first aspect may be configured such that the separate gear is assembled between the final-stage carrier and the final-stage planetary gears by inserting supporting pins for supporting the final-stage planetary gears through the separate gear.

With the configuration of the electric power tool according to the first aspect, the size of the final-stage carrier and the size of the bearing for the final-stage carrier can be set irrespective of the diameter of the gear portion. Accordingly, it is possible to reduce the size of the housing while the carrier and the bearing constituting the speed change mechanism can be prevented from being increased in diameter.

With the configuration of the electric power tool according to the second aspect, in addition to the advantageous effect of the first aspect, even if the gear portion is formed as a separate gear, the assembly of the electric power tool can be realized without increasing the number of assembling parts.

Other and further objects, features and advantages of the present invention will appear more fully from the following description.

BRIEF DESCRIPTION OF THE DRAWINGS

To better understand the claimed invention, and to show how the same may be carried into effect, reference will now be made, by way of example only, to the accompanying drawings.

DETAILED DESCRIPTION OF THE INVENTION

With reference to the accompanying drawings, an embodiment of the present invention will be described in detail.

Figure 1:
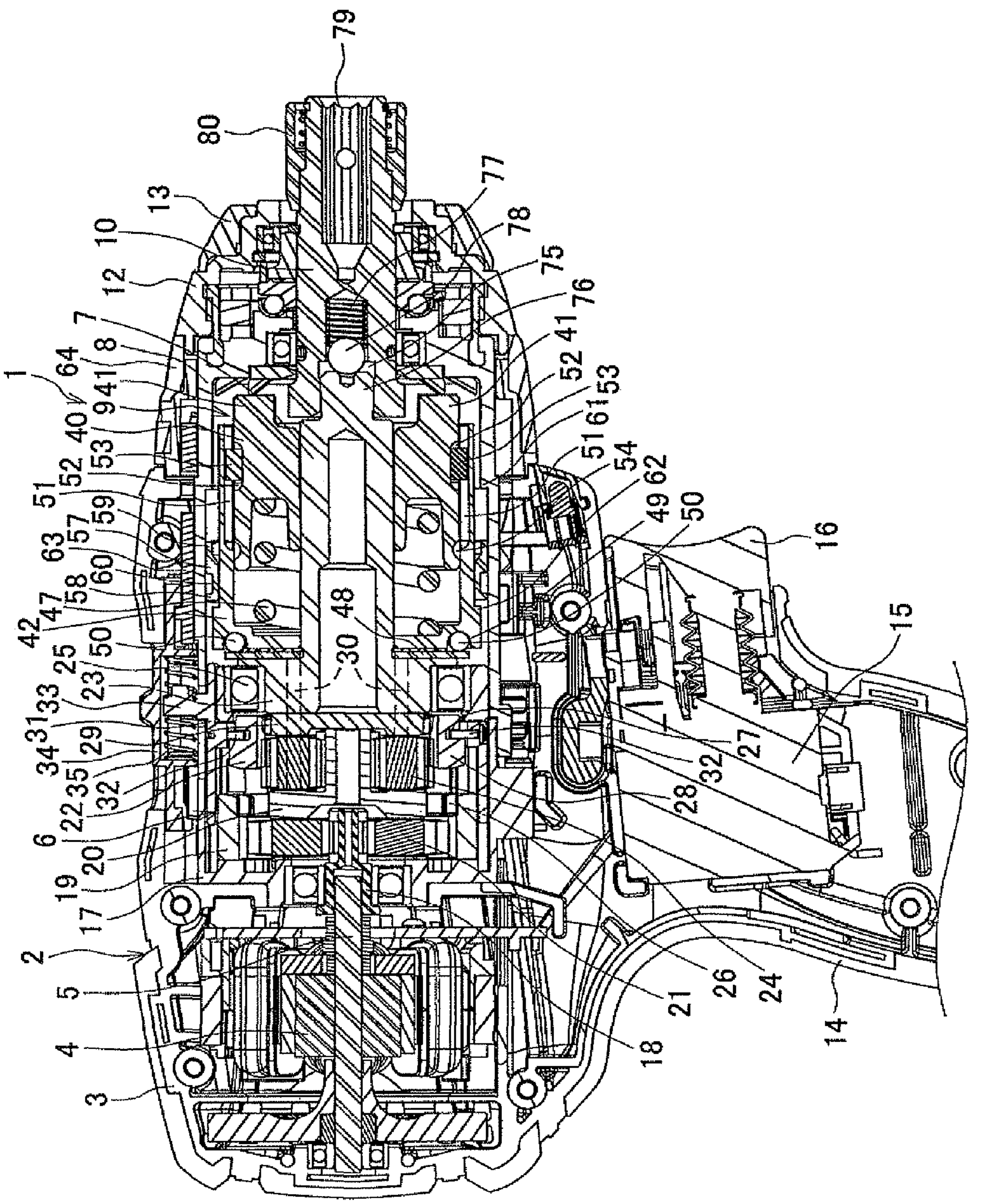
FIG. 1 is a partial longitudinal sectional view of an impact driver.
Figure 2:
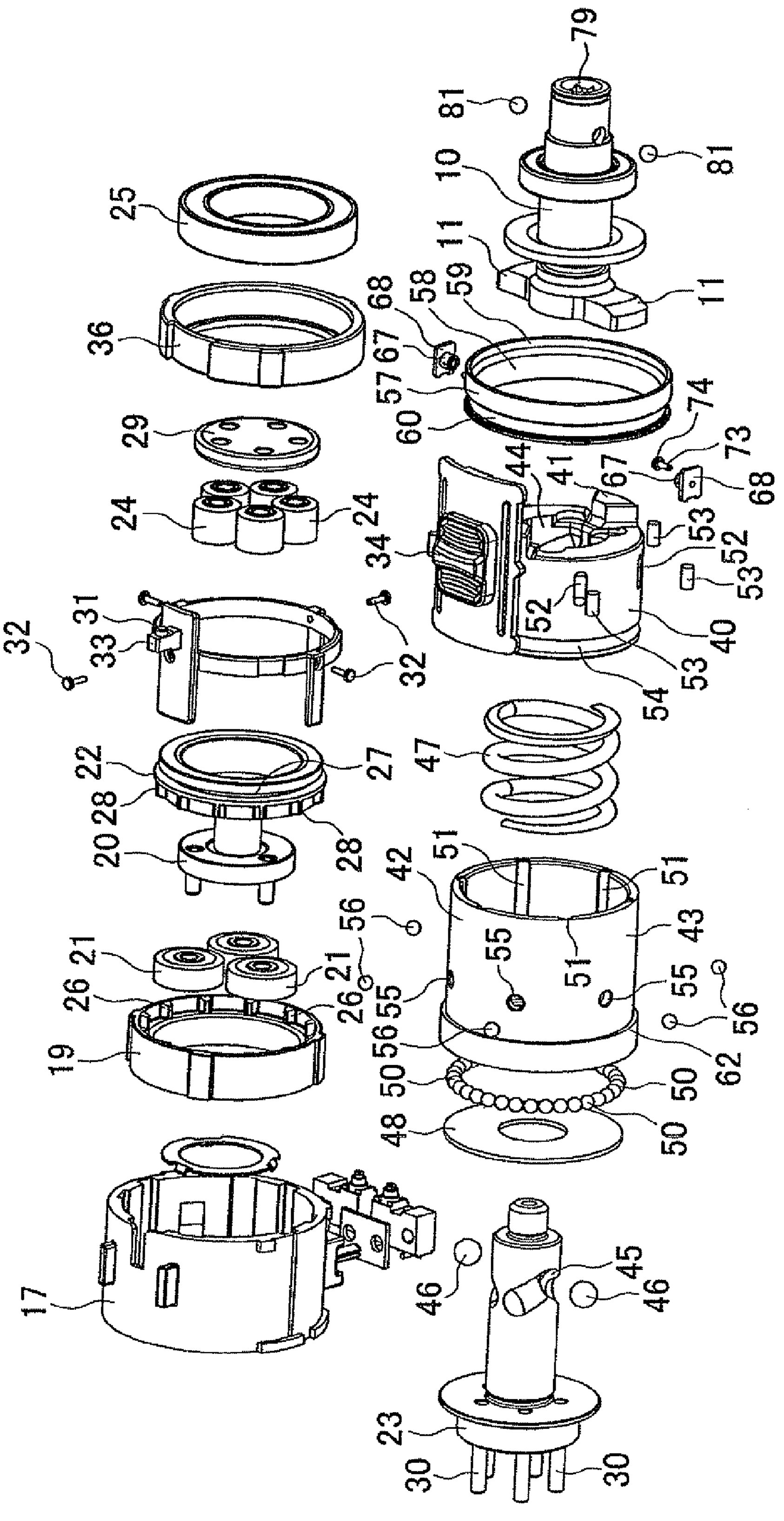
FIG. 2 is an exploded perspective view of an internal mechanism of the impact driver.

FIG. 1 shows an impact driver 1 as an embodiment of an electric power tool, and FIG. 2 shows a part of the internal mechanism of the impact driver 1. The impact driver 1 includes a main body housing 2 which is assembled from right and left housing halves 3, 3. Further, the main body housing 2 includes, from the rear side of the main body housing 2 (right side of FIG. 1 corresponds to the "front" side), a motor 4, a planetary gear reduction mechanism 6, and a spindle 7. A tubular inner housing 8 is mounted at the front side of the main body housing 2 and accommodates the spindle 7 and an impact mechanism 9. An anvil 10 arranged at a front side of and coaxially with the spindle 7 is rotatably supported by the inner housing 8 and a front housing 12 fixed to the front end of the inner housing 8, and the anvil 10 protrudes forward from the main body housing 2. Reference numeral 13 indicates a ring-shaped bumper which is made of rubber and fitted onto the front end of the front housing 12. A handle 14 extends downward from a lower part of the main body housing 2, and a switch 15 having a trigger 16 is positioned in the handle 14.

The planetary gear reduction mechanism 6 is accommodated in a tubular gear housing 17 which is assembled with the main body housing 2. At a rear side of the gear housing 17, a pinion 18 provided on an output shaft 5 of the motor 4 extends forward and into the gear housing 17. The planetary gear reduction mechanism 6 includes a first carrier 20 and a second carrier 23. The first carrier 20 is configured to carry first-stage planetary gears 21 within a first internal gear 19 while planetary motion of the first-stage planetary gears 21 is allowed. The second carrier 23 is configured to carry second-stage planetary gears 24 within a second internal gear 22 while planetary motion of the second-stage planetary gears 24 is allowed. The pinion 18 is meshed with the first-stage planetary gears 21, and the second carrier 23 as a final-stage carrier is integrally formed with the spindle 7 at the rear side of the spindle 7 and rotatably supported within the inner housing 8 by a ball bearing 25 as a bearing.

The first internal gear 19 has internal teeth 26 at its inner peripheral front-side surface, and the internal teeth 26 are provided equidistantly along the circumferential direction of the first internal gear 19. The second internal gear 22 has a ring-shaped engagement groove 27 at its outer peripheral front-side surface, and external teeth 28 are provided equidistantly along the circumferential direction of the second internal gear 22 at the outer peripheral rear-side surface thereof. The second internal gear 22 is slidable between an advanced position and a retracted position. The advanced position is a position in which the second internal gear 22 meshes both with a spur gear 29 which is integrally connected to the second carrier 23 at the rear side of the second carrier 23 and with the second-stage planetary gears 24. The retracted position is a position in which the second internal gear 22 only meshes with the second-stage planetary gears 24 with the internal teeth 26 of the first internal gear 19 and the external teeth 28 of the second internal gear 22 being meshed with each other.

The spur gear 29 is a separate gear disposed between the second carrier 23 and the planetary gears 24, and assembled by inserting supporting pins 30 for supporting the planetary gears 24 through the spur gear 29. The outer diameter of the second carrier 23 is smaller than that of the spur gear 29, wherein the outer diameter of the spur gear 29 corresponds to the major diameter including the distance of each gear tooth. Assuming that the spur gear 29 is integrally formed with the second carrier 23, it is necessary that the outer diameter of the second carrier 23 is greater than that of the spur gear 29 and a large-diameter ball bearing 25 has to be used for assembling the ball bearing 25 with the second carrier 23. On the contrary, according to this embodiment, the spur gear 29 is a discrete part separately formed from the second carrier 23, with the result that the spur gear 29 can be assembled with the second carrier 23 after assembling the ball bearing 25 and the second carrier 23. Therefore, it is not necessary that the outer diameter of the second carrier 23 and the inner diameter of the ball bearing 25 should be greater than the outer diameter of the spur gear 29. In this configuration, the second carrier 23 and the ball bearing 25 can be provided without increasing their sizes in the diametrical direction. As a result, the sizes of the gear housing 17 and the inner housing 8 in the diametrical direction can be reduced, and hence the size of the main body housing 2 can be reduced in the diametrical direction. Reference numeral 36 indicates a retaining ring for retaining the ball bearing 25 within the gear housing 17.

A slide ring 31 positioned at the outer periphery of the second internal gear 22 is capable of sliding in the front-and-rear direction along the inner peripheral surfaces of the gear housing 17 and the inner housing 8. The second internal gear 22 is connected to the slide ring 31 by inserting engagement pins 32 radially from outside to inside of the slide ring 31 to engage with the engagement groove 27 formed in the second internal gear 22. The slide ring 31 has a projection 33 which is formed at an upper outer periphery and protrudes upward from the gear housing 17. A slide button 34 is provided on the main body housing 2 so as to be slidable in the front-and-rear direction, and the projection 33 is retained by a slide button 34 through coil springs 35 disposed at front and rear sides of the projection 33.

Figure 4:
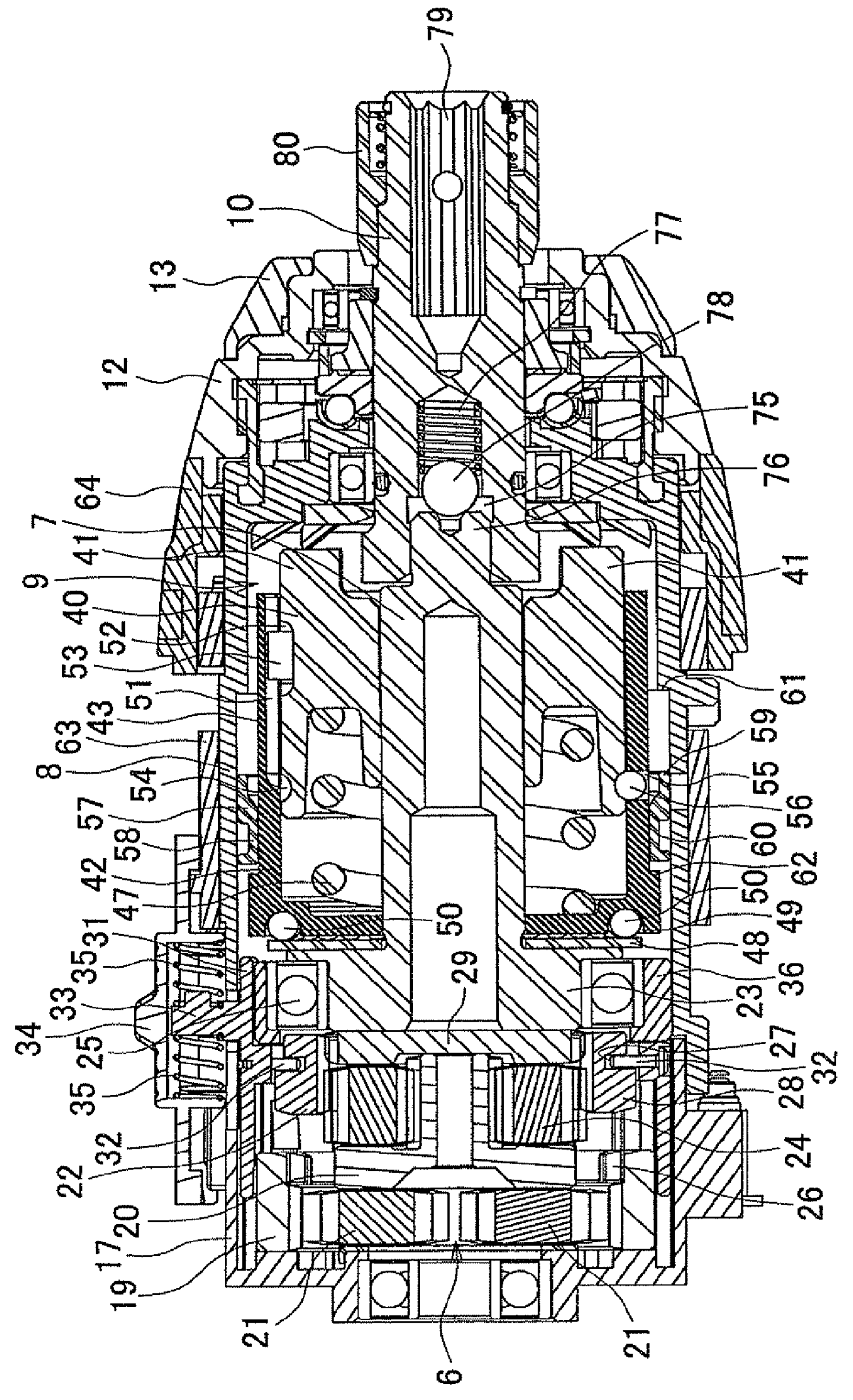
FIG. 4 is a partial longitudinal sectional view of the impact driver in an impact mode.
Figure 5:
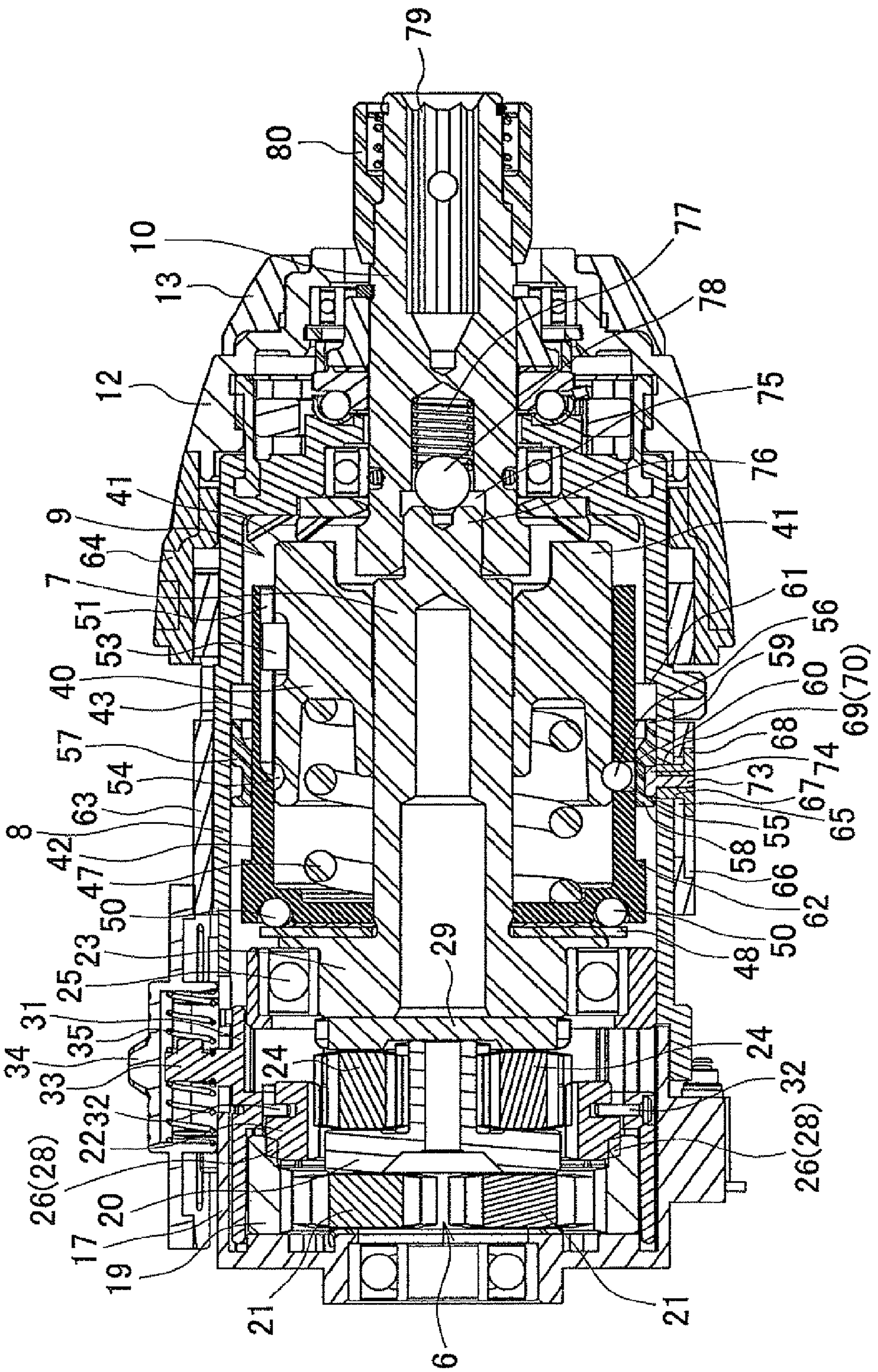
FIG. 5 is a partial longitudinal sectional view of the impact driver in a drill mode.

Accordingly, operating the slide button 34 to slide in the frontward direction or the rearward direction causes the second internal gear 22 to move through the slide ring 31 between the front position and the rear position. In other words, in an advanced position of the second internal gear 22 as shown in FIGS. 1 and 4, the second internal gear 22 unitarily rotates with the spur gear 29, so that the planetary motion of the planetary gears 24 is cancelled to achieve a high-speed mode, whereas in a retracted position of the second internal gear 22 as shown in FIG. 5, the second internal gear 22 becomes stationary to achieve a low-speed mode where the planetary motion of the planetary gears 24 is allowed.

The impact mechanism 9 includes a pair of arms 11 provided at the rear end of the anvil 10 and a hammer configured to be engaged with or disengaged from the arms 11. The hammer is divided into a tubular-shaped main hammer 40 and a sub hammer 42 shaped like a tube with a bottom. The main hammer 40 is fitted onto a front end portion of the spindle 7, and has a pair of engaging claws 41 projecting at the front surface thereof and engageable with the arms 11. The sub hammer 42 is coaxially and loosely fitted onto the spindle 7 at the rear side of the main hammer 40. Further, the sub hammer 42 opens at the front side thereof so that a peripheral wall 43 of the sub hammer 42 is inserted onto the main hammer 40 from the rear side of the main hammer 40. In other words, the diameter of the assembly made up of the main hammer 40 and the peripheral wall 43 of the sub hammer 42 corresponds to the outer diameter of a conventional hammer.

The main hammer 40 has reversed V-shaped grooves 44 formed in the inner peripheral surface of the main hammer 40. Each reversed V-shaped groove 44 extends and tapers from the front end toward the rear side of the main hammer 40. The spindle 7 has V-shaped grooves 45 formed in the outer peripheral surface of the spindle 7. Each V-shaped groove 45 extends with its front end portion facing toward the front side of the spindle 7. The reversed V-shaped grooves 44 and the V-shaped grooves 45 face each other and balls 46 are fitted between them, so that the main hammer 40 is connected to the spindle 7.

A coil spring 47 is fitted onto the spindle 7 and positioned between the main hammer 40 and the sub hammer 42, so that the main hammer 40 is urged toward a forward position in which the engaging claws 41 are engaged with the arms 11 and the sub hammer 42 is urged in a rearward direction. A washer 48 is inserted onto the spindle 7 and positioned between the sub hammer 42 and the second carrier 23. A ring-shaped groove 49 is formed in the rear end surface of the sub hammer 42, and a plurality of balls 50 are received in the ring-shaped groove 49 and extend rearwardly beyond the rear end surface to form a thrust bearing. Accordingly, the sub hammer 42 is urged by the coil spring 47 in the rearward direction and pressed in a state that the balls 50 is capable of rolling to a rearward position so as to abut against the washer 48.

A plurality of guide grooves 51 are formed in the inner peripheral surface of the peripheral wall 43 of the sub hammer 42. The guide grooves 51 are provided equidistantly along the circumferential direction of the sub hammer 42 and axially extend from the front end toward the rear end of the sub hammer 42. A plurality of oblong grooves 52 which are shorter than the guide grooves 51 are formed in the outer periphery of the main hammer 40 at the same distances as the guide grooves 51, and cylindrical-shaped connecting pins 53 are fitted both into the guide grooves 51 and into the oblong grooves 52. Accordingly, the main hammer 40 and the sub hammer 42 are connected by the connecting pins 53 such that they are unitarily rotatable in the rotational direction while each of them is capable of moving in the axial direction respectively.

A ring-shaped fitting groove 54 is circumferentially formed in the outer peripheral surface of the main hammer 40 in the vicinity of the rear end of the main hammer 40, whereas a plurality of circular holes 55 are formed in the peripheral wall 43 of the sub hammer 42, which are radially penetrating the sub hammer 42 at positions between and at the rear end positions of the guide grooves 51. Balls 56 are fitted into the corresponding circular holes 55.

A switch ring 57 is fitted onto the peripheral wall 43 of the sub hammer 42. The switch ring 57 has two-stepped diameters. A rear side of the switch ring 57 is formed as a smaller-diameter portion 58 slidably contacting the outer peripheral surface of the peripheral wall 43, and a front side of the switch ring 57 is formed as a large-diameter portion 59 which is radially spaced apart from the outer peripheral surface of the peripheral wall 43. A ring-shaped groove 60 is formed in the outer peripheral surface of the smaller-diameter portion 58. The switch ring 57 is slidable in the front-and-rear direction between a front-side stepped portion 61 provided on the inner periphery of the inner housing 8 and a rear-side stepped portion 62 provided on the rear-side outer periphery of the peripheral wall 43.

Figure 3:
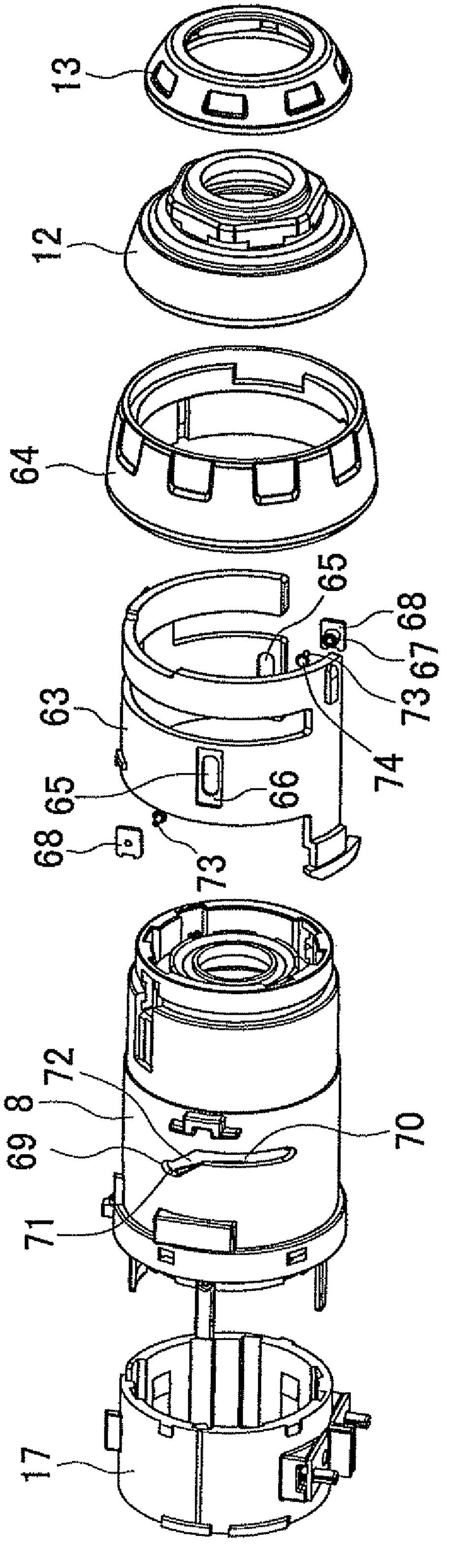
FIG. 3 is an exploded perspective view of housings other than a main body housing.

As best seen in FIG. 3, a connecting sleeve 63 is fitted onto the inner housing 8, and an operating sleeve 64 positioned at the front side of the main body housing 2 is mounted on a front-side outer periphery of the connecting sleeve 63 so as to be slidable with the connecting sleeve 63. A pair of through-holes 65 which are oblong openings extending in the front-and-rear direction are formed in the outer periphery of the connecting sleeve 63 at symmetrical positions with respect to a center point of the connecting sleeve 63. Further, the connecting sleeve 63 has a pair of rectangular-shaped guide recesses 66 in the outer peripheral surface thereof, and each guide recess 66 surrounds the corresponding through-hole 65.

Tubular-shaped guide holders 67 are formed on a square-shaped flange portion 68 which is fitted into the corresponding guide recesses 66. Further, the tubular-shaped guide holders 67 are inserted into the through-holes 65. The guide holders 67 radially penetrate through the through-holes 65 and extend into an inner region of the connecting sleeve 63 toward the axis of the connecting sleeve 63. The guide holders 67 are slidable in the front-and-rear direction with their flange portions 68 guided along the guide recesses 66. The inner housing 8 has a pair of guide grooves 69 including a front-side groove 70 and a rear-side groove 71. The front-side groove 70 is formed in the circumferential direction thereof at a position corresponding to the front end of the through-hole 65 and into which the guide holder 67 is inserted. The rear-side groove 71 is formed in the circumferential direction at a position corresponding to the rear end of the through-hole 65, and a slanted groove 72 connecting the front-side groove 70 and the rear-side groove 71. Guide pins 73 are inserted from the inner region of the inner housing 8 (i.e., direction from the axis of the inner housing 8) and into the guide holders 67, and head portions 74 of the guide pins 73 are fitted into the ring-shaped groove 60 of the switch ring 57.

Therefore, when the operating sleeve 64 is rotationally manipulated to cause the connecting sleeve 63 to rotate clockwise (in the rightward direction) as viewed from front, the guide holders 67 also move rightward along the circumferential direction of the connecting sleeve 63. Thereafter, when the guide holders 67 move along the guide grooves 69 and reach the rear-side grooves 71, the guide holders 67 position at the rear ends of the through-holes 65. At this position, as best seen in FIG. 4, the switch ring 57 connected to the guide holders 67 through the guide pins 73 is moved into a retracted position (first slide position) in which the large-diameter portion 59 is positioned outside the balls 56. In this retracted position, the balls 56 are sunk into the inner peripheral surface of the peripheral wall 43 and movable to a disengagement position in which the balls 56 are spaced apart from the ring-shaped fitting groove 54 of the main hammer 40, whereby an impact mode which allows retraction of the main hammer 40 is achieved.

Meanwhile, when the operating sleeve 64 is rotationally manipulated to cause the connecting sleeve 63 to rotate anticlockwise (in the leftward direction) as viewed from front, the guide holders 67 also move leftward along the circumferential direction of the connecting sleeve 63. Thereafter, when the guide holders 67 move along the guide grooves 69 and reach the front-side grooves 70, the guide holders 67 position at the front ends of the through-holes 65. At this position, as best seen in FIG. 5, the switch ring 57 is moved into an advanced position (second slide position) in which the small-diameter portion 58 is positioned outside the balls 56. In this advanced position, the balls 56 are pressed by the small-diameter portion 58 and fitted into the ring-shaped fitting groove 54 of the main hammer 40 (i.e., retained in a connecting position), whereby a drill mode is achieved, in which the main hammer 40 and the sub hammer 42 are connected in the front-and-rear direction to limit the retraction of the main hammer 40.

The anvil 10 has a shaft-receiving hole 75 formed in the rear surface at the shaft center position thereof. The spindle 7 has a front end portion 76 having a smaller diameter and sticking out from the front end of the spindle 7. The front end portion 76 of the spindle 7 is fitted into the shaft-receiving hole 75 of the anvil 10 and the front end of the spindle 7 is coaxially and rotatably supported by the anvil 10. A ball 78 provided in the shaft-receiving hole 75 is urged by a coil spring 77 and pressed against the end face of the front end portion 76 to receive a load in the thrust direction.

Further, at the front end of the anvil 10 which protrudes from the front housing 12, there are provided an insertion hole 79 for attaching a bit (not shown) and a chuck mechanism including a sleeve 80 which presses the balls 81 provided on the anvil 10 (see FIG. 2) into the insertion hole 79 at the retracted position so as to prevent the bit inserted into the insertion hole 79 from coming off from the anvil 9.

Operation of the impact driver 1 configured as described above will be described. First, description will be given of the operation in the impact mode as shown in FIG. 4 wherein the operating sleeve 64 has been rotationally manipulated to position the switch ring 57 in the retracted position. When the user manipulates the trigger 16 provided in the handle 14 to drive the motor 4, the rotation of the output shaft 5 of the motor 4 is transmitted to the spindle 7 through the planetary gear reduction mechanism 6 to thereby cause the spindle 7 to rotate. The spindle 7 then causes the main hammer 40 to rotate through the balls 46, so that the anvil 10 engaged with the main hammer 40 rotates. Therefore, a screw-tightening operation, etc. can be performed using the bit attached to the front end of the anvil 10. During this operation, the sub hammer 42 is connected in the rotational direction to the main hammer 40 through the connecting pins 53, so that the main hammer 40 and the sub hammer 42 rotate together.

As the screw-tightening operation proceeds and when a load applied to the anvil 10 increases to a certain threshold, the rotation of the main hammer 40 does not follow the rotation of the spindle 7, so that the main hammer 40 retreats or moves backward against the urging force of the coil spring 47 while the main hammer 40 rotates relatively with respect to the spindle 7 by the balls 46 rolling along the V-shaped grooves 45. In this time, the sub hammer 42 rotates together with the main hammer 40 through the connecting pins 53 while retraction of the main hammer 40 is allowed.

When the engaging claws 41 of the main hammer 40 are disengaged from the arms 11, the balls 46 are forced to roll by the urging force of the coil spring 47 and move forward along the V-shaped grooves 45, so that the main hammer 40 advances while rotating. Therefore, the engaging claws 41 of the main hammer 40 are reengaged with the arms 11 to generate a rotary impact force (impact). The main hammer 40 and the anvil 10 are repeatedly disengaged from and reengaged with each other to provide a retightening function of the impact driver 1.

During this operation, the sub hammer 42 also rotates following the main hammer 40, so that the engagement and disengagement of the hammer with respect to the anvil 10 are performed by the total mass of the main hammer 40 and the sub hammer 42. Therefore, even if the hammer is divided into the main hammer 40 and the sub hammer 42, the rotary impact force will not be decreased. Further, when the hammer rotates, the balls 50 on the rear end surface of the sub hammer 42 roll on the front surface of the washer 48 and a rotational resistance of the hammer is decreased. Therefore, the sub hammer 42 can be rotated smoothly even if the coil spring 47 expands and contracts in accordance with the forward and rearward movements of the main hammer 40. Further, even if the main hammer 40 repeats the forward and rearward movements upon generation of the impact, the sub hammer 42 is retained at its rearward position and does not move forward and rearward. Therefore, vibration can be suppressed upon generation of the impact.

Second, description will be given of the operation in the drill mode as shown in FIG. 5 wherein the operating sleeve 64 has been rotationally manipulated to position the switch ring 57 in the advanced position. When the user manipulates the trigger 16 to drive the motor 4, the main hammer 40 and the sub hammer 42 rotate together in accordance with the rotation of the spindle 7 to thereby unitarily rotate the anvil 10.

In this drill mode, even if a load applied to the anvil 10 increases, retraction of the main hammer 40 is restricted because of the balls 56, so that the engagement and disengagement of the main hammer 40 are not carried out with respect to the anvil 10. Therefore, the impact driver 1 does not generate impact and the anvil 10 unitarily rotates with the spindle 7.

According to the impact driver 1 as described above in this embodiment, since the gear portion is formed as a separately formed spur gear 29 which is assembled with the second carrier 23 after assembling the ball bearing 25 with the second carrier 23, the size of the second carrier 23 and the size of the ball bearing 25 can be set irrespective of the outer diameter of the spur gear 29. Therefore, diameter of the second carrier 23 and the ball bearing 25 constituting the speed change mechanism can be reduced, which leads to reducing the size of the main body housing 2.

In particular, since the spur gear 29 is assembled between the second carrier 23 and the planetary gears 24 by inserting the supporting pins 30 for supporting the planetary gears 24 through the spur gear 29, even if the spur gear 29 is formed as a separate gear, the assembly of the impact driver 1 can be realized without increasing the number of assembling parts.

Although the present invention has been described in detail with reference to the above exemplary embodiment, the present invention is not limited to the above specific embodiment and various changes and modifications may be made without departing from the scope of the appended claims.

In the above embodiment, the spur gear is assembled with the second carrier using the supporting pins. However, other means such as threading engagement members may be employed in addition to or instead of the supporting pins.

Further, as long as the speed change mechanism is provided between the final-stage carrier and the planetary gears, the planetary gear reduction mechanism is not limited to one including two-stage carriers and may include three-stage carriers or more. The bearing for the final-stage carrier is not limited to the ball bearing, and other bearings such as a needle bearing may be employed.

Other than the above, the housing may not include the inner housing. As an alternative, the housing may not include the inner housing and the front housing, and a hammer case accommodating the impact mechanism may be coupled to the main body housing at the front side of the main body housing. Of course, the present invention is not limited to an impact driver, and is applicable to other electric power tools such as an angle impact driver, an impact wrench, and an electric screw driver. It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool comprising:

a housing;

a motor disposed in the housing;

a planetary gear reduction mechanism positioned at a front side of the motor and including:

multi-stage planetary gears, multi-stage carriers arranged in an axial direction of the motor, each multi-stage carrier being configured to carry a plurality of planetary gears, a bearing assembled with a final-stage carrier so as to rotatably support the final-stage carrier, and a separate gear configured to be secured to the final-stage carrier; and an internal gear configured to be rotatable and axially slidable while allowing planetary motion of final-stage planetary gears supported by the final-stage carrier, wherein the internal gear is selectively slidable between an advanced position in which the internal gear is positioned rearward of the bearing and meshed both with the separate gear secured to the final-stage carrier and with the final-stage planetary gears and a retracted positioned in which the internal gear is only meshed with the final-stage planetary gears so that rotation of the internal gear is limited in the housing, whereby rotation speed output from the final-stage carrier is variable.

2. The electric power tool according to claim 1, wherein the separate gear is secured between the final-stage carrier and the final-stage planetary gears via supporting pins configured to support the final-stage planetary gears.

3. The electric power tool according to claim 1, wherein an outer diameter of the final-stage carrier is equal to or smaller than that of the separate gear.

4. The electric power tool according to claim 1, wherein the separate gear is a spur gear.

5. The electric power tool according to claim 1, wherein the final-stage carrier is integrally formed with a spindle at a rear side of the spindle.

6. The electric power tool according to claim 1, wherein the bearing is a ball bearing.

7. The electric power tool according to claim 1, wherein in the retracted position the internal gear is engaged with a penultimate-stage internal gear configured to allow planetary motion of penultimate-stage planetary gears to limit the rotation of the internal gear.

8. The electric power tool according to claim 7, wherein the internal gear and the penultimate-stage internal gear are engaged with each other through external teeth provided on an outer periphery of the internal gear and internal teeth provided on an inner periphery of the penultimate-stage internal gear.

9. The electric power tool according to claim 1, wherein the housing is provided with a slide button configured to be slidable in a front-and-rear direction, and the internal gear is connected to the slide button through a slide ring, whereby the advanced position and the retracted position of the internal gear can be selected by operating the slide button.

10. The electric power tool according to claim 9, wherein the internal gear is connected to the slide ring by inserting engagement pins radially from outside to inside of the slide ring to engage with an engagement groove formed in an outer periphery of the internal gear.

11. The electric power tool according to claim 9, wherein the slide ring has a projection at an outer periphery thereof, and the slide ring is retained by and engaged with the slide button through coil springs disposed at front and rear sides of the projection.

12. The electric power tool according to claim 3, wherein the outer diameter of the final-stage carrier is smaller than that of the separate gear.

13. The electric power tool according to claim 1, wherein an inner diameter of the bearing is equal to or less than an outer diameter of the separate gear.

14. The electric power tool according to claim 13, wherein the inner diameter of the bearing is less than the outer diameter of the separate gear.

15. A method of assembling the electric power tool according to claim 1, the method comprising:

assembling the bearing with the final-stage carrier from a rear side of the final-stage carrier, and securing the separate gear to the final-stage carrier from the rear side of the final-stage carrier after assembling the bearing with the final-stage carrier.

16. An electric power tool comprising:

a motor;

a pinion rotated by the motor;

a first plurality of planetary gears meshed with the pinion;

a second plurality of planetary gears;

a spur gear disposed forward of the second plurality of planetary gears;

a carrier disposed forward of the spur gear;

at least one supporting pin by which the second set of planetary gears, the spur gear, and the carrier are fitted; and an internal gear that is capable of meshing with the second set of planetary gears and the spur gear and that is movable in a front and rear direction.

* * * * *